(12) United States Patent
Somanath et al.

(10) Patent No.: US 7,594,405 B2
(45) Date of Patent: Sep. 29, 2009

(54) CATENARY MID-TURBINE FRAME DESIGN

(75) Inventors: Nagendra Somanath, Manchester, CT (US); Keshava B. Kumar, South Windsor, CT (US); Christopher M. Dye, South Windsor, CT (US); William A. Sowa, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/178,376

(22) Filed: Jul. 23, 2008

(65) Prior Publication Data

US 2008/0276621 A1 Nov. 13, 2008

Related U.S. Application Data

(63) Continuation of application No. 11/494,032, filed on Jul. 27, 2006.

(51) Int. Cl.
F02C 7/20 (2006.01)

(52) U.S. Cl. .................... 60/796; 60/226.1; 415/213.1

(58) Field of Classification Search .............. 60/226.1, 60/791, 796, 797; 415/208.2, 209.2, 210.1, 415/213.1, 142, 191, 229; 248/560, 575, 248/604, 605, 618, 621, 637, 638, 676
See application file for complete search history.

(56) References Cited

U.S. PATENT DOCUMENTS

| | | | |
|---|---|---|---|
| 3,403,889 A | 10/1968 | Ciokajlo | |
| 3,620,641 A * | 11/1971 | Keen et al. | 415/229 |
| 4,492,078 A | 1/1985 | Williamson | |
| 4,859,143 A | 8/1989 | Larrabee et al. | |
| 5,249,418 A | 10/1993 | Finn | |
| 5,307,622 A * | 5/1994 | Ciokajlo et al. | 60/39.162 |
| 5,483,792 A | 1/1996 | Czachor et al. | |
| 6,082,959 A | 7/2000 | Van Duyn | |
| 6,428,269 B1 | 8/2002 | Boratgis et al. | |
| 6,619,030 B1 | 9/2003 | Seda et al. | |
| 6,708,482 B2 | 3/2004 | Seda | |
| 6,883,303 B1 | 4/2005 | Seda | |
| 7,097,412 B2 | 8/2006 | DiTomasso | |
| 2006/0093468 A1* | 5/2006 | Orlando et al. | 415/68 |
| 2007/0231134 A1 | 10/2007 | Kumar et al. | |
| 2007/0237635 A1 | 10/2007 | Nagendra et al. | |
| 2007/0261411 A1* | 11/2007 | Nagendra et al. | 60/796 |
| 2008/0031727 A1* | 2/2008 | Sjoqvist | 415/142 |
| 2008/0134688 A1* | 6/2008 | Somanath et al. | 60/797 |

\* cited by examiner

*Primary Examiner*—Michael Cuff
*Assistant Examiner*—Phutthiwat Wongwian
(74) *Attorney, Agent, or Firm*—Kinney & Lange, P.A.

(57) ABSTRACT

An engine casing assembly having dual load transfer points includes a U-shaped mid-turbine frame, an engine casing, a plurality of dimples, a strut and a mounting apparatus. The engine casing has an exterior surface and an interior surface. A plurality dimples are formed in the engine casing so that U-shaped protrusions are formed in the interior surface and U-shaped indentions are formed in the exterior surface. A strut connects one U-shaped protrusion to the mid-turbine frame and a mounting apparatus located within an indention so that a load is transferred from the mid-turbine frame to the engine casing and the mounting apparatus.

11 Claims, 6 Drawing Sheets

CATENARY MID-TURBINE FRAME DESIGN

CROSS-REFERENCE TO RELATED APPLICATION(S)

This is a continuation-in-part of U.S. application Ser. No. 11/494,032, filed Jul. 27, 2006.

BACKGROUND

The present invention generally relates to the field of gas turbine engines. In particular, the invention relates to an engine casing for a jet turbine engine.

Turbofans are a type of gas turbine engine commonly used in aircraft, such as jets. The turbofan generally includes a high and a low pressure compressor, a high and a low pressure turbine, a high pressure rotatable shaft, a low pressure rotatable shaft, a fan, and a combuster. The high-pressure compressor (HPC) is connected to the high pressure turbine (HPT) by the high pressure rotatable shaft, together acting as a high pressure system. Likewise, the low pressure compressor (LPC) is connected to the low pressure turbine (LPT) by the low pressure rotatable shaft, together acting as a low pressure system. The low pressure rotatable shaft is housed within the high pressure shaft and is connected to the fan such that the HPC, HPT, LPC, LPT, and high and low pressure shafts are coaxially aligned.

Outside air is drawn into the jet turbine engine by the fan and the HPC, which increases the pressure of the air drawn into the system. The high-pressure air then enters the combuster, which burns fuel and emits the exhaust gases. The HPT directly drives the HPC using the exhaust gases to rotate the high pressure shaft. The LPT uses the exhaust generated in the combuster to turn the low pressure shaft, which powers the LPC and the fan. The fan continually brings air into the system. The air brought in by the fan bypasses the HPT and LPT and acts to increase the engine's thrust, driving the jet forward.

In order to support the high and low pressure systems, bearings are located within the jet turbine engine to help distribute the load created by the high and low pressure systems. The bearings are connected to an engine casing that houses a mid-turbine frame located between the HPT and the LPT by bearing support structures. The bearing support structures can be, for example, bearing cones. The loads from the bearing support structures are transferred to the engine casing through the mid-turbine frame. Decreasing the weight of the engine casing can significantly increase the efficiency of the jet turbine engine and the jet itself.

SUMMARY

An engine casing assembly having dual load transfer points includes a U-shaped mid-turbine frame, an engine casing, a plurality of dimples, a strut and a mounting apparatus. The engine casing has an exterior surface and an interior surface. A plurality dimples are formed in the engine casing so that U-shaped protrusions are formed in the interior surface and U-shaped indentions are formed in the exterior surface. A strut connects one U-shaped protrusion to the mid-turbine frame and a mounting apparatus located within an indention so that a load is transferred from the mid-turbine frame to the engine casing and the mounting apparatus.

In one embodiment, mounts are embedded in the dimples. In another embodiment, rails radially surround the engine casing and rail fins are embedded in the dimples and extend from the rails.

DETAILED DESCRIPTION

Figure 1:
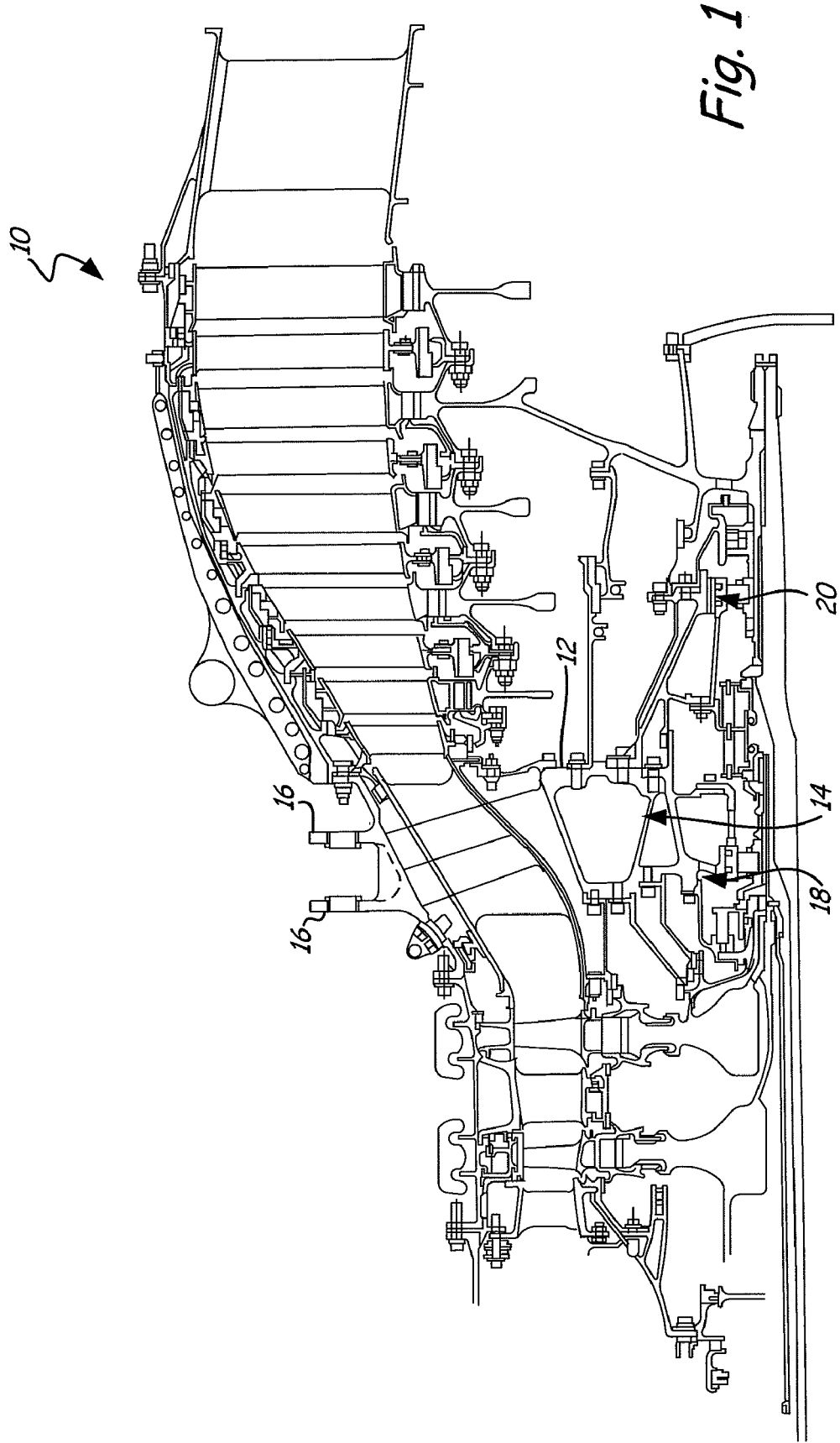
FIG. 1 is a partial sectional view of an intermediate portion of a gas turbine engine.

FIG. 1 shows a partial sectional view of an intermediate portion of a gas turbine engine 10 about a gas turbine engine axis centerline. Gas turbine engine 10 generally includes engine casing 12, mid-turbine frame 14, mounts 16, first bearing 18, and second bearing 20. Engine casing 12 of gas turbine engine 10 has a lightweight design that efficiently transfers loads from first and second bearings 18 and 20 through mid-turbine frame 14 to mounts 16. The design of engine casing 12 also allows duel load transfer points and enables membrane load transfer, providing load equilibrium through engine casing 12 to mounts 16.

Engine casing 12 houses mid-turbine frame 14 and protects mid-turbine frame 14 from its surroundings. Engine casing 12 functions to transfer the loads from mid-turbine frame 14 to mounts 16. The structure of engine casing 12 does not require rails, giving engine casing 12 a lightweight and cost-effective structure. Additionally, the elimination of rails reduces the drag on engine casing 12. In one embodiment, engine casing 12 weighs between approximately 15% and approximately 22% less than a conventional engine casing. In one embodiment, engine casing 12 weighs less than approximately 160 pounds. In one embodiment, engine casing 12 weighs between approximately 140 pounds and approximately 150 pounds.

Mid-turbine frame 14 is housed within engine casing 12 and is connected to engine casing 12 and first and second bearings 18 and 20. Mid-turbine frame 14 transfers the loads from first and second bearings 18 and 20 to engine casing 12 and mounts 16.

First and second bearings 18 and 20 are located at forward and aft ends of gas turbine engine 10, respectively, below engine casing 12. First and second bearings 18 and 20 support thrust loads, vertical tension, side gyroscopic loads, as well as vibratory loads from high and low pressure rotors located in gas turbine engine 10. All of the loads supported by first and second bearings 18 and 20 are transferred to engine casing 12 and mounts 16 through mid-turbine frame 14.

Figure 2:
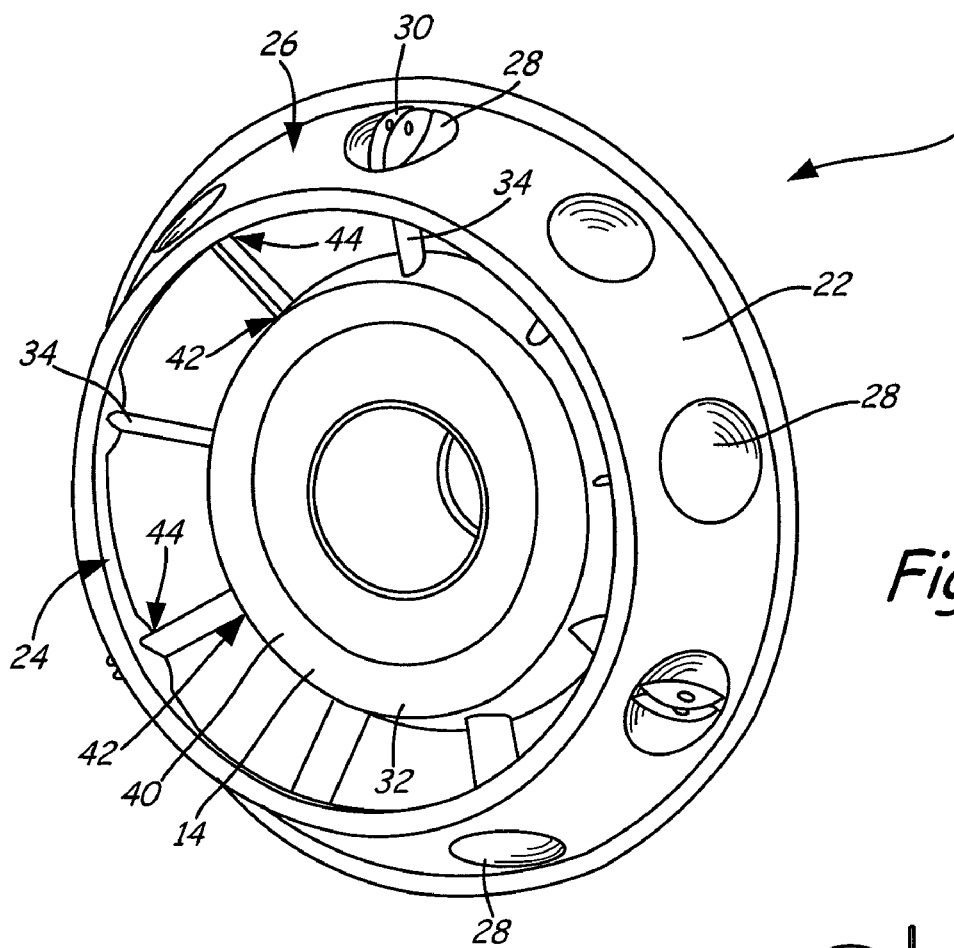
FIG. 2 is an enlarged perspective view of an engine casing having embedded mounts.
Figure 3:
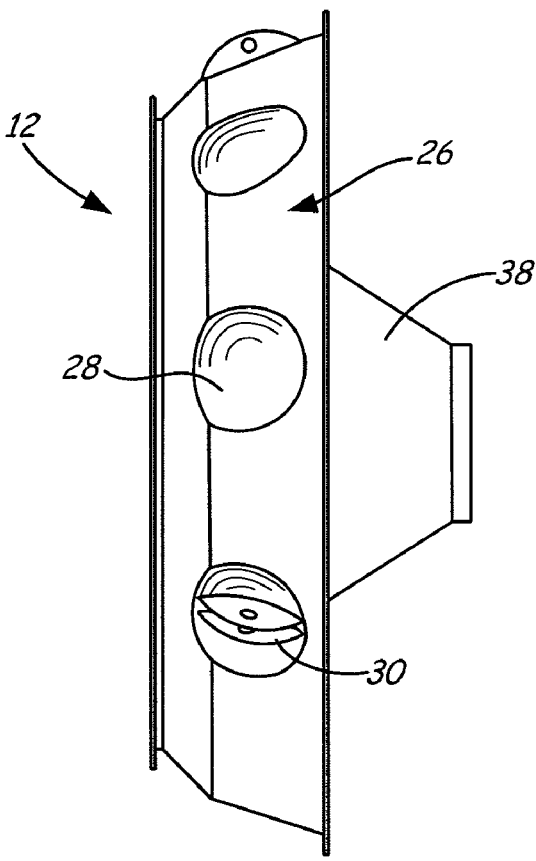
FIG. 3 is a side view of the engine casing having embedded mounts.

FIGS. 2 and 3 show an enlarged perspective view of engine casing 12 housing mid-turbine frame 14 and a side view of engine casing 12, respectively, and will be discussed in conjunction with one another. Engine casing 12 generally includes ring structure 22 having interior surface 24, exterior surface 26, and dimples 28. The area between interior surface 24 and exterior surface 26 gives ring structure 22 a height, $H_{ring}$. Dimples 28 are equally spaced apart along the circumference of ring structure 22 and are located between interior surface 24 and exterior surface 26, creating indentations at exterior surface 26 and protrusions at interior surface 24. Dimples 28 provide localized strength and stiffen engine casing 12 by increasing the resistance to bending, leading to efficient multi-directional load transfer from mid-turbine frame 14 to engine casing 12. In one embodiment, dimples 28 have a height $H_{dimples}$ of between approximately one times and approximately three times height $H_{ring}$ of ring structure 22. Engine casing 12 also includes embedded mounts 30 positioned within dimples 28.

Mounting flanges 30 are embedded within dimples 28 and eliminate the need for rails. Because mounting flanges 30 are embedded within dimples 28, mounting flanges 30 enable localized load paths directly to engine casing 12 and provide efficient load and stress distribution in combination with the stiffening effect of dimples 28 on engine casing 12. Mounting flanges 30 also serve to connect engine casing 12 to mounts 16 (shown in FIG. 1). Mounting flanges 30 have a height at least equal to height $H_{dimples}$ of dimples 28 to ensure that mounting flanges 30 can adequately act as load transfer means to mounts 16. In one embodiment, engine casing 12 includes at least three mounting flanges 30.

Mid-turbine frame 14 generally includes torque box 32 and plurality of struts 34. First and second bearings 18 and 20 (shown in FIGS. 1 and 5) are connected to mid-turbine frame 14 by first bearing cone 36 and second bearing cone 38 (shown in FIG. 5), respectively. First and second bearings cones 36 and 38 are continuously rotating with high and low pressure rotors of gas turbine engine 10 (shown in FIG. 1) and transfer the loads from first and second bearings 18 and 20 to mid-turbine frame 14.

Torque box 32 has a ring structure 40 and is positioned between first and second bearing cones 36 and 38 and struts 34. Torque box 32 takes the loads, or torque, from first and second bearing cones 36 and 38 and combines them prior to transferring the loads to struts 34, which extend from the circumference of torque box 32.

Struts 34 of mid-turbine frame 14 extend from torque box 32 of mid-turbine frame 14 and transfer the loads from first and second bearing cones 36 and 38 entering through torque box 32 to engine casing 12. Each of struts 34 has a first end 42 connected to torque box 32 and a second end 44 connected to engine casing 12. The loads from first and second bearings 36 and 38 travel from torque box 32 through struts 34 to engine casing 12. In one embodiment, dimples 28 and struts 34 are equal in number such that each strut 34 is connected to engine casing 12 at a different dimple 28. In one embodiment, struts 34 have an elliptical shape and are sized to take a load and transfer it in a vertical direction toward engine casing 12. In one embodiment, nine struts are positioned approximately forty degrees apart from one another along the circumference of torque box 32. In another embodiment, twelve total struts are positioned approximately thirty degrees apart from one another along the circumference of torque box 32.

Figure 4:
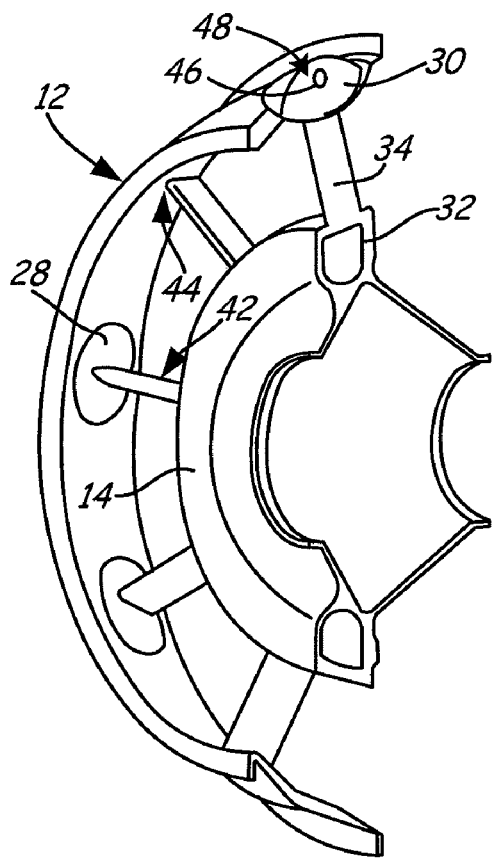
FIG. 4 is a cross-sectional perspective view of the engine casing having embedded mounts.
Figure 5:
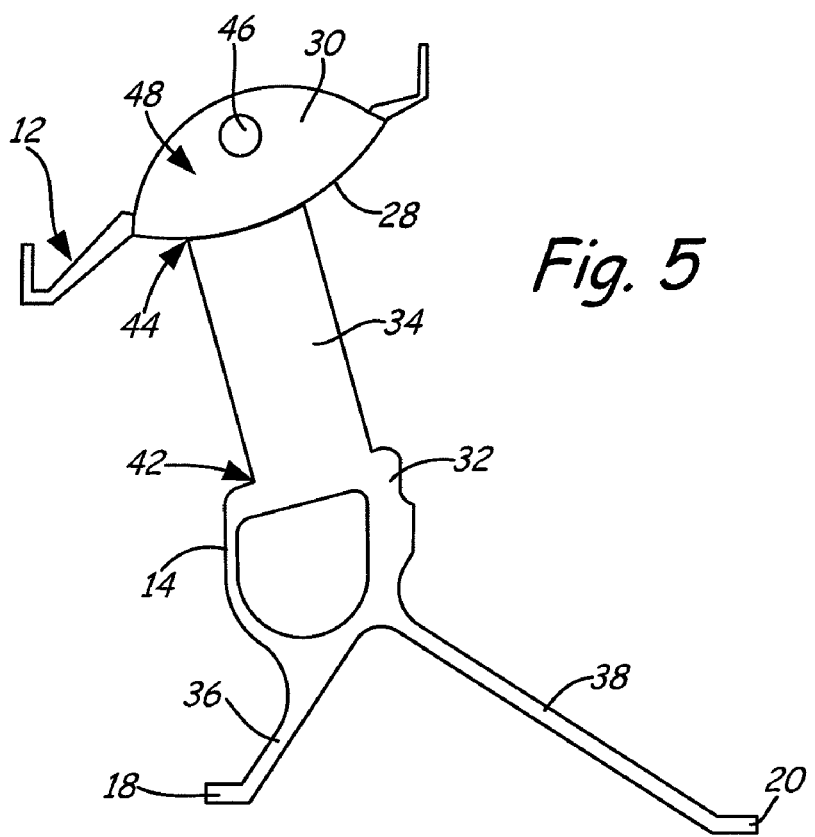
FIG. 5 is a cross-sectional perspective view of a segment of the engine casing having embedded mounts.

FIGS. 4 and 5 show a cross-sectional perspective view and a schematic diagram of engine casing 12 and mid-turbine frame 14, respectively, and will be discussed in conjunction with one another. As can be seen in FIGS. 4 and 5, struts 34 of mid-turbine frame 14 connect mid-turbine frame 14 to engine casing 12. Second end 44 of struts 34 are connected to interior surface 24 of engine casing 12 at the protrusions caused by dimples 28. Because struts 34 connect to engine casing 12 at the protrusions caused by dimples 28, the overall length of struts 34 is decreased. The shortened length of struts 34 between dimple 28 and torque box 32 increases the critical buckling load as well as the load carrying capacity of struts 34. In addition to the shortened length, struts 34 may also be hollow, further reducing the weight of mid-turbine frame 14. When coupled with struts 34, dimples 28 act as local stiffeners and lead to increased local membrane-bending stiffness. Struts 34 have a minor axis $A_{minor1}$ and a major axis $A_{major1}$, and dimples 28 have a minor axis $A_{minor2}$ and a major axis $A_{major2}$. In one embodiment, minor axis $A_{minor2}$ of dimples 28 is approximately equal to minor axis $A_{minor1}$ of struts 34 and major axis $A_{major2}$ of dimples 28 is approximately two times major axis $A_{major1}$ of struts 34.

Mounting flanges 30 are positioned within dimples 28 to connect engine casing 12 to mounts 16. The combination of dimples 28 and mounting flanges 30 embedded within dimples 28 adds stiffness to engine casing 12 and creates a higher load carrying capacity for engine casing 12. Embedded mounting flanges 30 enable local stress redistribution and transfer to a stiffer engine casing 12. Hole 46 is located at a top portion 48 of each of mounting flanges 30 to resolve mount loads from first and second bearings 18 and 20.

The loads are transferred from first and second bearings 18 and 20 through first and second bearing cones 36 and 38, respectively, and combine at torque box 32 and struts 34 of mid-turbine frame 14. Struts 34 then carry the loads to dimples 28 and mounting flanges 30 of engine casing 12. The U-shaped design of both torque box 32 and dimples 28 provide dual U-load transfer points, allowing efficient load transfer through mid-turbine frame 14 and engine casing 12 to mounting flanges 30 and mounts 16. The U-structure is beneficial because of the membrane bending efficiency of shell structures, reducing the overall weight of engine casing 12. Although FIGS. 4 and 5 depict torque box 32 of mid-turbine frame 14 as a U-shaped torque box design, engine casing 12 can be used with any mid-turbine frame design without departing from the scope of the invention.

The engine casing design with embedded mounts offers a lightweight structure that efficiently distributes load from a first and second bearing to a pair of engine mounts. The loads from the first and second bearings first pass through a mid-turbine frame having a plurality of struts that attach the mid-turbine frame to the engine casing. The engine casing includes a ring structure with a plurality of dimples equally spaced around the circumference of the ring structure. Each of the struts of the mid-turbine frame connects to the engine casing at one of the dimples. The dimples provide localized stiffening of the engine casing as well as multi-directional load transfer. In addition, the dimples eliminate the need for rails and shorten the length of the struts, reducing the overall weight of the engine casing.

Figure 6:
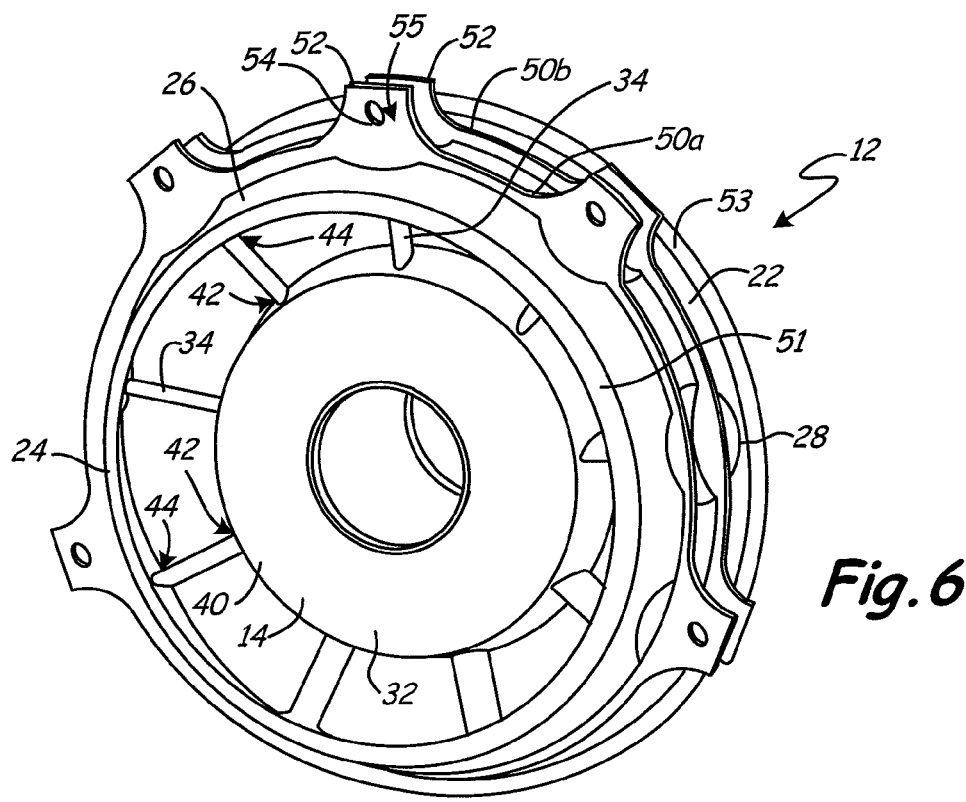
FIG. 6 is an enlarged perspective view of an engine casing having rails and rail fins.
Figure 7:
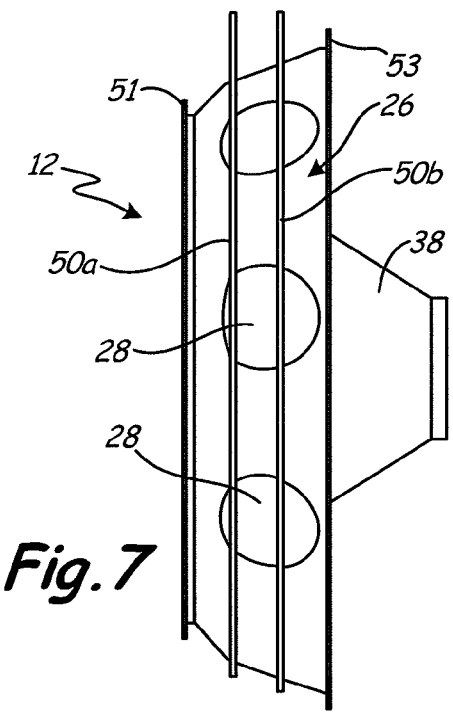
FIG. 7 is a side view of the enlarged engine casing having rails and rail fins.

FIGS. 6 and 7 show another embodiment of engine casing 12 having dimples 28. Engine casing 12 generally includes ring structure 22 having exterior surface 26, interior surface 24, dimples 28, rails 50a and 50b (referred to generally as rails 50), rail fins 52, high pressure flange 51 and low pressure flange 53.

As described above, ring structure 22 surrounds mid-turbine frame 14. Ring structure 22 transfers loads from the mid-turbine frame 14 to mounts 16.

Dimples 28 are spaced apart along the circumference of ring structure 22 and create 360 degree U-shaped indentations at exterior surface 26 and protrusions at interior surface 24 of ring structure 22. Dimples 28 act as reinforcement members in multiple directions from the center of dimples 28. Dimples 28 enable membrane bending load transfer and a light weight engine casing 12. Dimples 28 also provide improved load transfer to mounts 16. In the cross-section, dimples 28 may be referred to as catenaries.

Circular rails 50 radially surround ring structure 22 and extend from exterior surface 26 so that rails 50 have a constant outer diameter. In one example, rails 50 extend about 1 inch from ring structure 22. Rails 50 redistribute the load from struts 34 to rail fins 52.

Rails 50 also maintain the circular geometry of engine casing 12, preventing engine casing 12 from interfering with surrounding stationary structures. Engine casing 12 is a rotating structure located between the high and low pressure turbines and is subjected to the flow of hot gases between the turbines, which can be 2000° F. or higher. When a circular tube is heated, the circumference of the tube uniformly increases. However, engine casing 12 is connected to mounts 16 at various locations along engine casing 12. Without rails 50a and 50b, mounts 16 would cause engine casing 12 to grow in a non-circular shape and interfere with surrounding structures. Rails 50a and 50b restrict engine casing 12 so that the circumference of engine casing 12 uniformly changes, maintaining and reinforcing the circular geometry of engine casing 12. Although two rails 50 are shown, any number of rails 50 may surround engine casing 12 to reinforce the circular geometry.

Rail fins 52 are embedded in dimples 28 and extend from rails 50 at dimples 28. By being embedded in dimples 28, rail fins 52 reduce the weight of engine casing 12. Rail fins 52 aid heat transfer and serve to connect engine casing 12 to mounts 16 (shown in FIG. 1). Each rail fin 52 has rail fin hole 54 in the upper portion 55 of rail fin 52 which connects rail fin 52 to mount 16. One rail fin 52 is necessary at every location where mount 16 comes in contact with engine casing 12. Where mounts 16 come into contact with engine casing 12 depends upon the external surface architecture and the contact mount conditions. In one example, engine casing 12 includes at least four rail fins 52.

High pressure flange 51 and low pressure flange 53 extend from the ends of engine casing 12. High pressure flange 51 and low pressure flange 53 connect engine casing 12 between the high and low pressure turbines. High pressure flange 51 connects engine casing 12 to the high pressure turbine and low pressure flange 53 connects engine casing 12 to the low pressure turbine.

Figure 8:
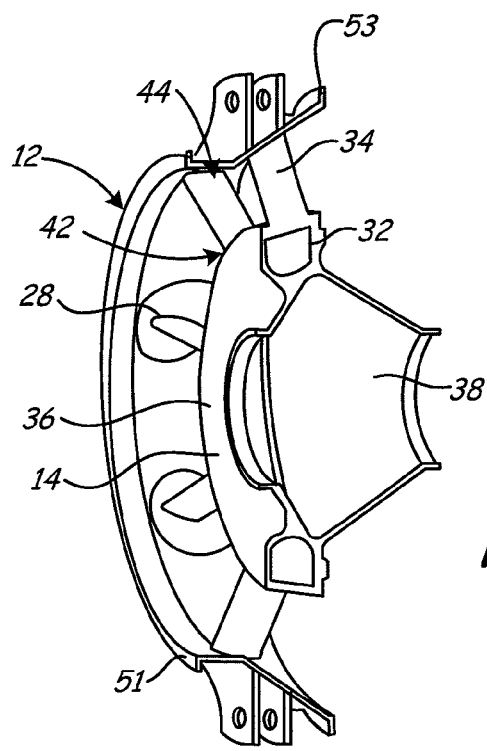
FIG. 8 is a cross-sectional perspective view of the engine casing having rails and rail fins.
Figure 9:
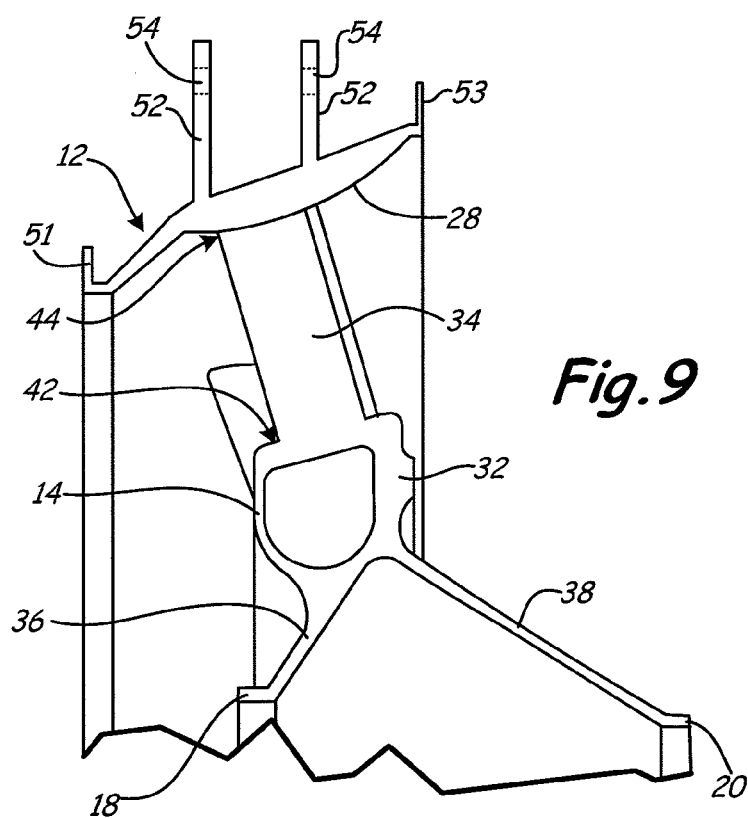
FIG. 9 is a cross-sectional perspective view of a segment of the engine casing having rails and rail fins.

FIGS. 8 and 9 show a cross-sectional perspective view and a schematic view of mid-turbine frame 14 and engine casing 12 having rails 50 and rail fins 52, respectively, and will be discussed in conjunction with one another. As can be seen in FIGS. 5 and 6, struts 34 of mid-turbine frame 14 connect mid-turbine frame 14 to engine casing 12. First end 42 of strut 34 connects to mid-turbine frame 14 and second end 44 of strut 34 connects to the protrusion in interior surface 24 of engine casing 12 caused by dimple 28. In one example, strut 34 connects to engine casing 12 at the center of dimple 28. Because struts 34 connect to engine casing 12 at the protrusion caused by dimple 28, the overall length of strut 34 is decreased as compared to an engine casing having no dimples 28. The buckling stress of struts 34 varies inversely as the square of the length of the struts. Therefore, a shorter strut 34 will increase the critical buckling stress and the load carrying capacity of struts 34.

Additionally, the shortened length of strut 34 reduces the weight of mid-turbine frame 14. Struts 34 may be hollow, further reducing the weight of mid-turbine frame 14.

When coupled with struts 34, dimples 28 act as local stiffeners and lead to increased local membrane-stiffness of engine casing 12. The increased local strength of casing 12 allows engine casing 12 to handle an increased amount of stress, thus increasing the critical buckling stress of engine casing 12. In one example, the critical buckling stress of dimpled engine casing 12 increased by about 24% to about 30% as compared to a conventional engine casing (i.e. a casing that in cross-section is parallel with the horizontal axis, and may also be referred to as a flat plate design), given the same materials and the same wall height. Therefore, less material is used in a dimpled engine casing 12 to provide the same strength, thus reducing the weight of engine casing 12. In one example, the wall height of a dimpled engine casing 12 having rails 50 and rail fins 52 may be reduced by about 10% to about 15% while still having the same critical buckling stress as a conventional engine casing having a flat plate design. In another example, the weight of dimpled engine casing 12 having rails 50 and rail fins 52 is reduced by about 10% to about 15% as compared to a conventional engine casing. In another example, dimpled engine casing 12 having rails 50 and rail fins 52 weighs less than about 180 pounds. In another example, dimpled engine casing 12 having rails 50 and rail fins 52 weights between about 150 pounds and about 160 pounds.

Figure 10:
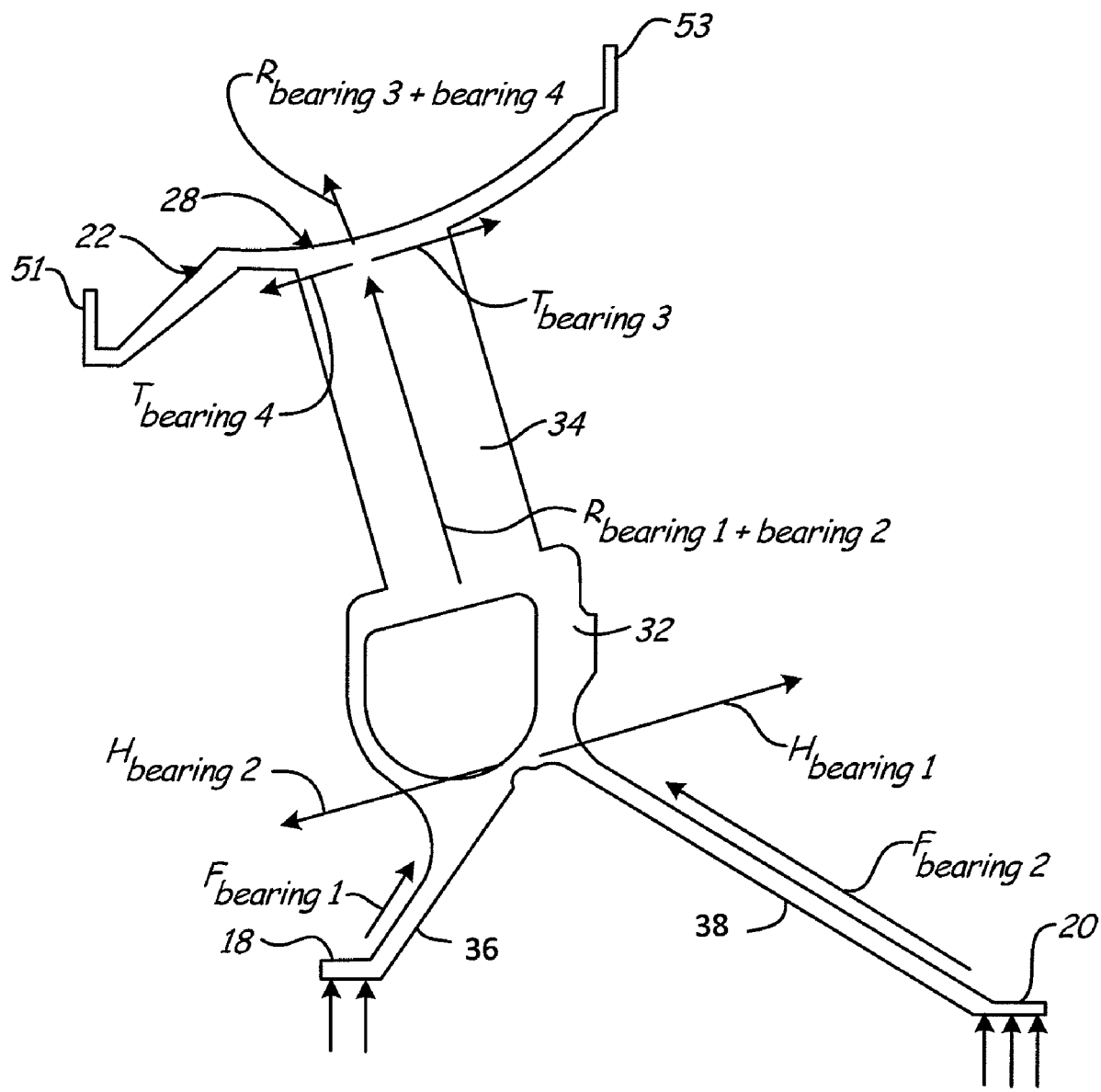
FIG. 10 is a free body diagram of an engine casing having dimples.

FIG. 10 is a free form diagram of a mid-turbine frame having dimples 28. The loads, or torques, from forward and aft bearings 18 and 20 and are transferred through first and second bearing cones 36 and 38 as $F_{bearing1}$ and $F_{bearing2}$ to torque box 32. Loads, $F_{bearing1}$ and $F_{bearing2}$ intersect at torque box 32 at an angle, and decompose into equivalent loads having horizontal components $H_{bearing1}$ and $H_{bearing2}$ and vertical components $V_{bearing1}$ and $V_{bearing2}$. The horizontal components may have some canceling effect on each other, and resultant $R_{bearing1+bearing2}$ is transferred through strut 34. For example, as illustrated in FIG. 10, the horizontal components may be equal and in opposite directions so that the horizontal components cancel each other out, leaving only the vertical components for resultant $R_{bearing1+bearing2}$.

Resultant $R_{bearing1+bearing2}$ is transferred through strut 34, and intersects dimple 28. At dimple 28, resultant $R_{bearing1+bearing2}$ decomposes into equivalent loads having tangential components $T_{bearing3}$ and $T_{bearing4}$ and vertical components $V_{bearing3}$ and $V_{bearing4}$. Tangential components $T_{bearing3}$ and $T_{bearing4}$ are in opposite directions and have some canceling effect on each other. Tangential loads $T_{bearing3}$ and $T_{bearing4}$ are redistributed through ring structure 22, and are transferred to the high pressure turbine and low pressure turbine by high pressure flange 56 and low pressure flange 58. The resultant of vertical components $V_{bearing3}$ and $V_{bearing4}$, resultant $R_{bearing3+bearing4}$, is transferred to mounts 16 through embedded mounting flanges 30 or rail fins 52.

As shown, resultant $R_{bearing1+bearing2}$ is composed of only vertical components due to the U-shape of torque box 32. However, any mid-turbine frame design may be used with engine casing 12, and resultant $R_{bearing1+bearing2}$ may intersect dimple 28 at any angle.

The load transferred to mounts 16 is less than the sum of the loads from first and second bearings 18 and 20. The dual load transfer points of the assembly formed by engine casing 12 and mid-turbine frame 14 provides efficient load equilibrium and reduces the load from first and second bearings 18 and 20 twice, once at torque box 32 and once at dimple 28.

Engine casing 12 uses structural geometry to strengthen engine casing 12 as well as ensure that the loads are transferred to engine casing 12 efficiently. Dimples 28 enable membrane bending load transfer and facilitate multidirectional load transfer. Dimples 28 lie in two planes and transfer loads in two directions. The loads bend dimples 28 in the vertical plane and stretch dimples 28 in the horizontal plane.

In contrast, an engine casing without dimples (wherein the casing appears as a flat plate in the cross-section) can only transfer loads in the horizontal plane. Dimples 28 increase the load transfer efficiency.

Dimples 28 also reduce the weight of engine casing 12 by decreasing the length of struts 34 and providing local strength in engine casing 12, which allows the casing walls to be thinner while still providing the same strength. The light weight design increases the load and specific fuel consumption (SFC)/thrust efficiently of the gas turbine engine. Additionally, the decreased strut length provides improved stability against buckling.

Dimples 28 together with U-shaped torque box 32 provide dual load transfer points, which reduce the loads transferred from first and second bearings 18 and 20 twice. Dimples 28 and torque box 32 also provide efficient load equilibrium and improves load transfers to mounts 16.

Although the present invention has been described with reference to preferred embodiments, workers skilled in the art will recognize that changes may be made in form and detail without departing from the spirit and scope of the invention.

The invention claimed is:

1. An engine casing assembly for multidirectional load transfer from a mid-turbine frame, the engine casing assembly comprising:
    a mid-turbine frame;
    an engine casing having an interior surface and an exterior surface;
    a plurality of rails radially surrounding the engine casing;
    a plurality of dimples formed in the engine casing so that protrusions are formed in the interior surface of the engine casing and indentions are formed in the exterior surface of the engine casing;
    a plurality of struts extending from the mid-turbine frame to the protrusions in the engine casing;
    a plurality of rail fins located in the plurality of dimples and extending from the rails so that loads from the mid-turbine frame are transferred to the engine casing and mounts.

2. The engine casing assembly of claim 1, wherein there are at least four rail fins.

3. The engine casing assembly of claim 2, wherein one strut extends from each dimple.

4. An engine casing assembly comprising:
    a mid-turbine frame;
    a ring structure having an interior surface and an exterior surface;
    a plurality of shell stiffening dimples along the circumference of the ring structure for stiffening the ring structure; wherein the shell stiffening dimples are formed in the ring structure so that protrusions are formed in the interior surface of the ring structure and indentions are formed in the exterior surface of the ring structure; a cylindrical rail radially surrounding and extending from the exterior surface of the ring structure;
    a plurality of struts for connecting the ring structure to the mid-turbine frame; and a
    plurality of rail fins extending from the rail.

5. The engine casing assembly of claim 4, wherein the rail extends about 1 inch from the exterior surface of the ring structure.

6. The engine casing assembly of claim 4, wherein there are at least four rail fins.

7. The engine casing assembly of claim 4, wherein the rail fins are embedded in the dimples.

8. The engine casing assembly of claim 7, wherein one rail fin is embedded in each dimple.

9. The engine casing assembly of claim 4, wherein the struts connect to the ring structure at the shell stiffening dimples.

10. The engine casing assembly of claim 4, wherein the engine casing has a weight of less than approximately 180 pounds.

11. The engine casing assembly of claim 4, wherein the engine casing has a weight between approximately 150 pounds and 160 pounds.

\* \* \* \* \*